United States Patent
De Nora

(10) Patent No.: US 11,346,480 B2
(45) Date of Patent: May 31, 2022

(54) CONNECTING KIT FOR AN IRRIGATION HOSE

(71) Applicant: DEN DI DE NORA PAOLO, Valsamoggia (IT)

(72) Inventor: Paolo De Nora, Casalecchio di Reno (IT)

(73) Assignee: DEN DI DE NORA PAOLO, Valsamoggia (IT)

(*) Notice: Subject to any disclaimer, the term of this patent is extended or adjusted under 35 U.S.C. 154(b) by 79 days.

(21) Appl. No.: 17/004,287

(22) Filed: Aug. 27, 2020

(65) Prior Publication Data

US 2021/0062952 A1 Mar. 4, 2021

(30) Foreign Application Priority Data

Aug. 30, 2019 (IT) .................. 102019000015315

(51) Int. Cl.
*F16L 37/098* (2006.01)
*F16L 33/22* (2006.01)

(52) U.S. Cl.
CPC ......... *F16L 37/0985* (2013.01); *F16L 33/223* (2013.01)

(58) Field of Classification Search
CPC ... F16L 37/0985; F16L 33/223; F16L 33/224; F16L 33/227; F16L 19/065

USPC ........................................... 285/245
See application file for complete search history.

(56) References Cited

U.S. PATENT DOCUMENTS

| | | | | |
|---|---|---|---|---|
| 6,283,443 | B1* | 9/2001 | Taneya | F16L 37/133 |
| 6,467,816 | B1 | 10/2002 | Huang | |
| 7,900,972 | B2* | 3/2011 | Wang | F16L 37/0985 |
| 8,181,997 | B2* | 5/2012 | Wang | F16L 37/0985 |
| 2009/0236851 | A1* | 9/2009 | Hampel | F16L 19/065 |
| 2019/0285212 | A1* | 9/2019 | Righi | F16L 33/02 |

FOREIGN PATENT DOCUMENTS

JP 2016020743 A 2/2016

OTHER PUBLICATIONS

Italian Search Report dated Mar. 23, 2020 from counterpart Italian Patent Application No. 201900015315.

* cited by examiner

*Primary Examiner* — Zachary T Dragicevich
(74) *Attorney, Agent, or Firm* — Shuttleworth & Ingersoll, PLC; Timothy Klima

(57) ABSTRACT

A connecting kit for an irrigation hose includes a hollow male body having, at a relative end, a connector including an end head and a hollow female body, including a second seat for the end head and having a second longitudinal extension greater than a first longitudinal extension of the end head.

9 Claims, 4 Drawing Sheets

Fig.2
Fig.3
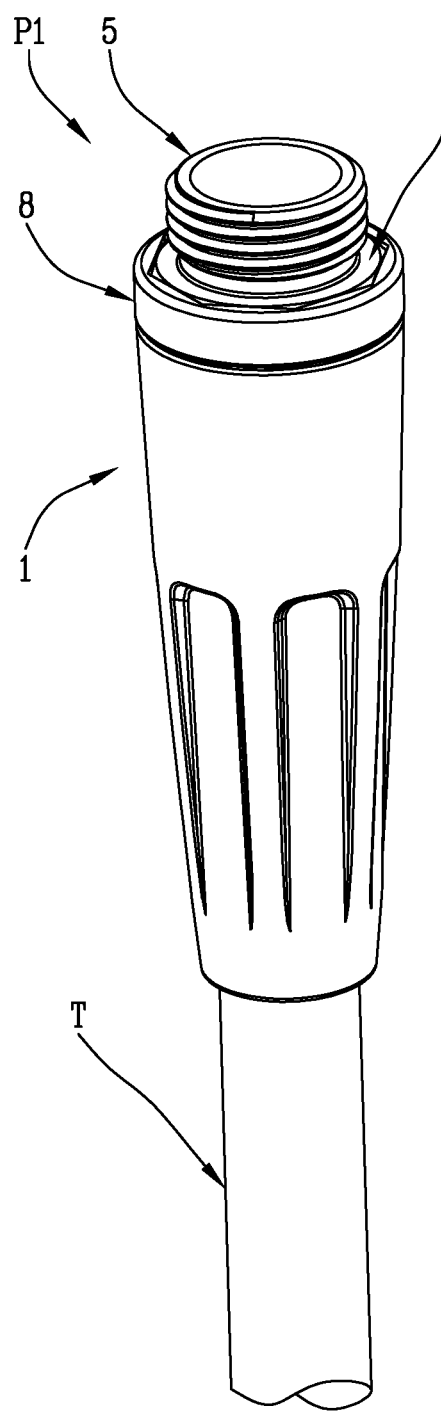
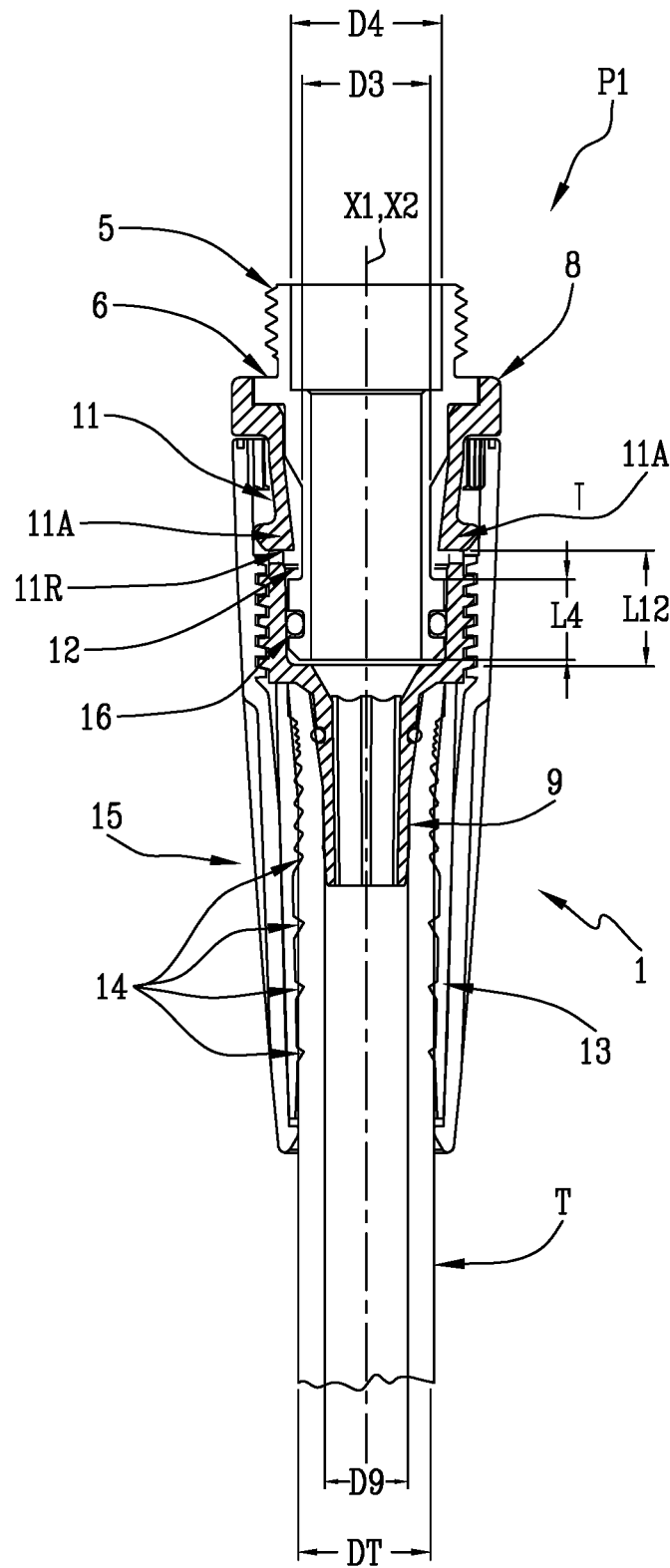

Fig.4
Fig.5
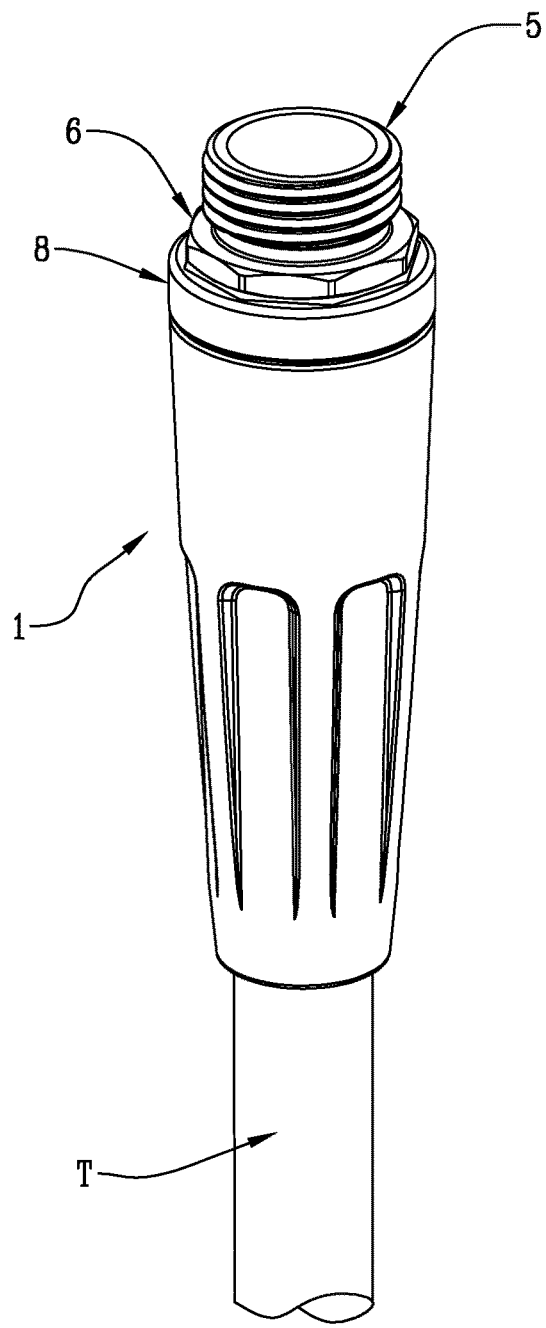
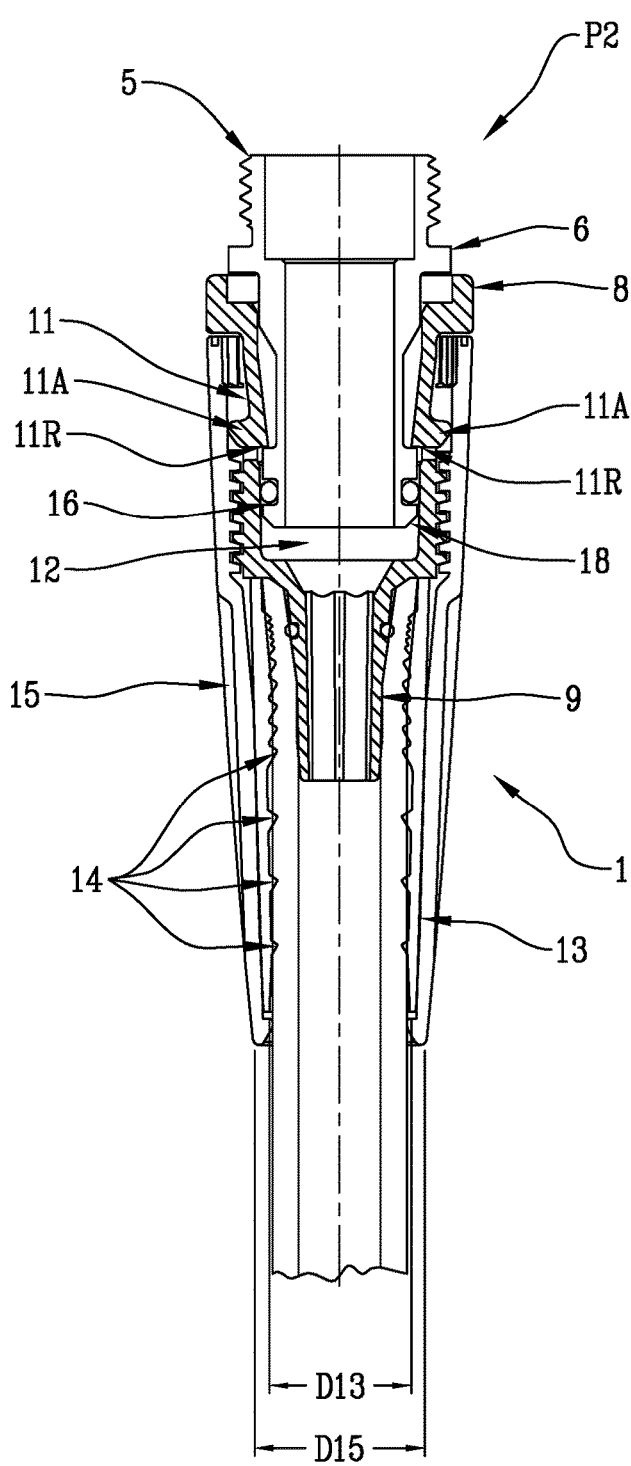

CONNECTING KIT FOR AN IRRIGATION HOSE

This application claims priority to Italian Patent Application 102019000015315 filed Aug. 30, 2019, the entirety of which is incorporated by reference herein.

This invention relates to a rotatable connecting kit for irrigation hoses.

Kits are widely known for joining or coaxial connection between a stretch of hose and the water mains or accessories for distributing fluid (water) in gardens.

In the US market, these connecting kits comprise two portions associated with each other for connecting a stretch of hose to the water mains, generally at a tap, or to an irrigation accessory or to the connection of another hose to be extended.

These terminals forming the kit consist of the following:
- a first portion, with a tubular cross-section and having a longitudinal axis of extension, coupled in an integral fashion, for example by crimping, with the stretch of hose to be joined;
- a second section associated with the first portion, with a tubular cross-section and having a longitudinal axis of extension, having a thread for being screwed and coupled to the water mains, generally at a tap, or to an irrigation accessory (for example, but not necessarily, a water nebuliser) or to the connector of another hose which is to be extended, also having a thread configured for coupling with the thread of said second portion.

Generally speaking, the second portion is a free nut, that is to say, a nut which is able to rotate freely relative to the first portion until the connecting kit is simultaneously connected to the irrigation hose, on one side, and to the tap of the water mains or to the irrigation accessory or the connection of another hose, on the other side.

Once the second portion has been engaged with the tap, that is to say, once the free nut has been screwed to the thread of the tap, there is no longer the possibility of free rotation between the first portion and the second portion, which are therefore rigidly connected.

However, the rigidity of the constraint prevents the possibility of free rotation of the hose during use.

This limitation makes it difficult to use the hose, especially if the hose is of the anti-twisting type since it offers resistance to the twisting of the hose on itself.

In order to guarantee the absence of annoying twisting, the user is therefore forced to perform complex operations to disentangle the twists in the hose and guarantee an optimum operation of the hose and a convenient use during the irrigation operations.

There is therefore a strongly felt need in the irrigation system field for irrigation hoses equipped with connectors to the water mains or to the irrigation accessories which do not have problems of unwanted twisting during use.

Another strongly felt need is that of having a connecting kit which makes the replacement of irrigation accessories connectable to the hose, which is also connected to the connecting kit, particularly simple.

The aim of the invention is to provide a connecting kit for irrigation hoses which overcomes the drawbacks of the prior art and fulfils the above-mentioned needs.

In particular, the aim of the invention is to provide a connecting kit for irrigation hoses which is simple to use and which independently resolves the problems linked to the twisting of the hose on itself during use, keeping practically unaltered the dimensions and the overall size of the connection with respect to the prior art techniques.

Another aim of the invention is to provide a rotatable connecting kit for irrigation hoses which has a convenient attachment to, and detachment from, the tap of the water mains and an easy replacement of the irrigation accessories connectable to the hose.

A further aim of the invention is to provide a rotatable connecting kit for irrigation hoses which keeps practically unaltered the safety and the production cost of the kit compared with the prior art techniques in the field.

Said aims are fully achieved by the rotatable connecting kit for irrigation hoses according to the invention as characterised in the appended claims.

The features of the invention will become more apparent from the following detailed description of a preferred, non-limiting embodiment, illustrated purely by way of example in the accompanying drawings, in which:

FIG. 2 is a perspective view of the connecting kit for irrigation hoses, in a first configuration;

FIG. 3 is a cross-section, according to a longitudinal plane, of the connecting kit for irrigation hoses of FIG. 2;

FIG. 4 is a perspective view of the connecting kit for irrigation hoses, in a second configuration;

FIG. 5 is a cross-section, according to a longitudinal plane, of the connecting kit for irrigation hoses of FIG. 4;

Figure 1:
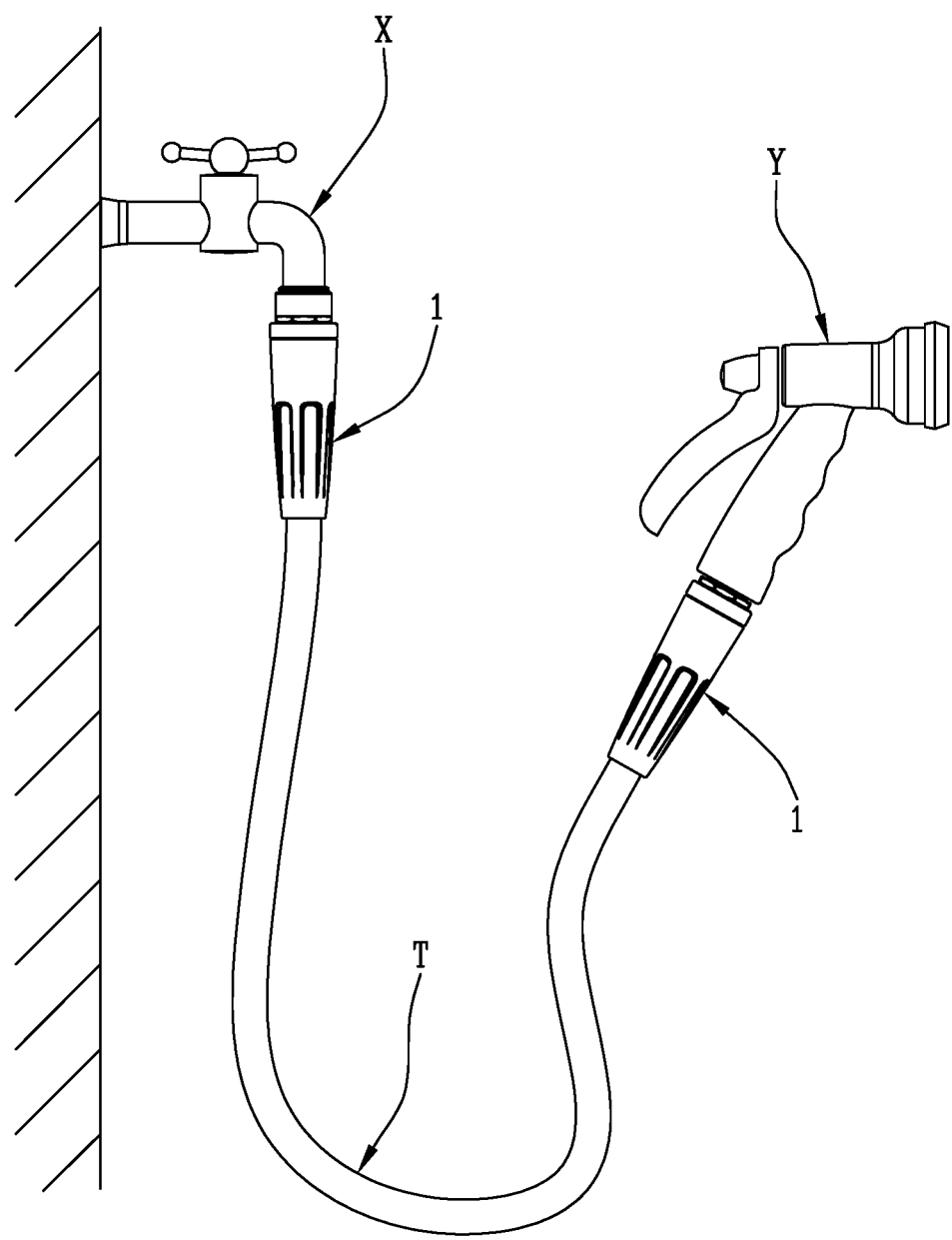
FIG. 1 illustrates a first and a second connecting kit for irrigation hoses according to the invention, with the first kit installed on a tap of a water mains and an end of an irrigation hose and the second kit at the other end of the irrigation hose and an accessory for irrigation.

With reference to the accompanying drawings, and in particular to FIG. 1, the connecting kit according to the invention, labelled 1 in its entirety, is used for the joining or coaxial connection of a stretch of hose T with a tap X, connected to the water mains, or to an irrigation accessory Y.

Figure 6:
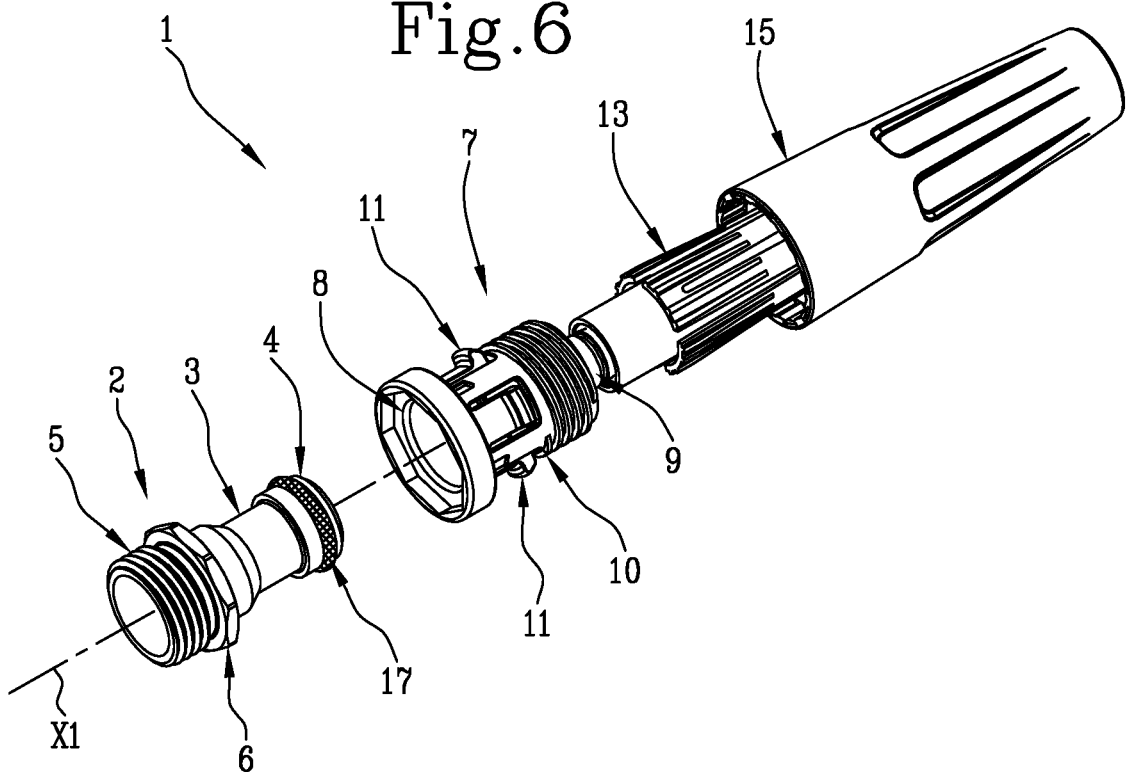
FIG. 6 is an exploded perspective view of a first embodiment of the connecting kit for irrigation hoses.
Figure 7:
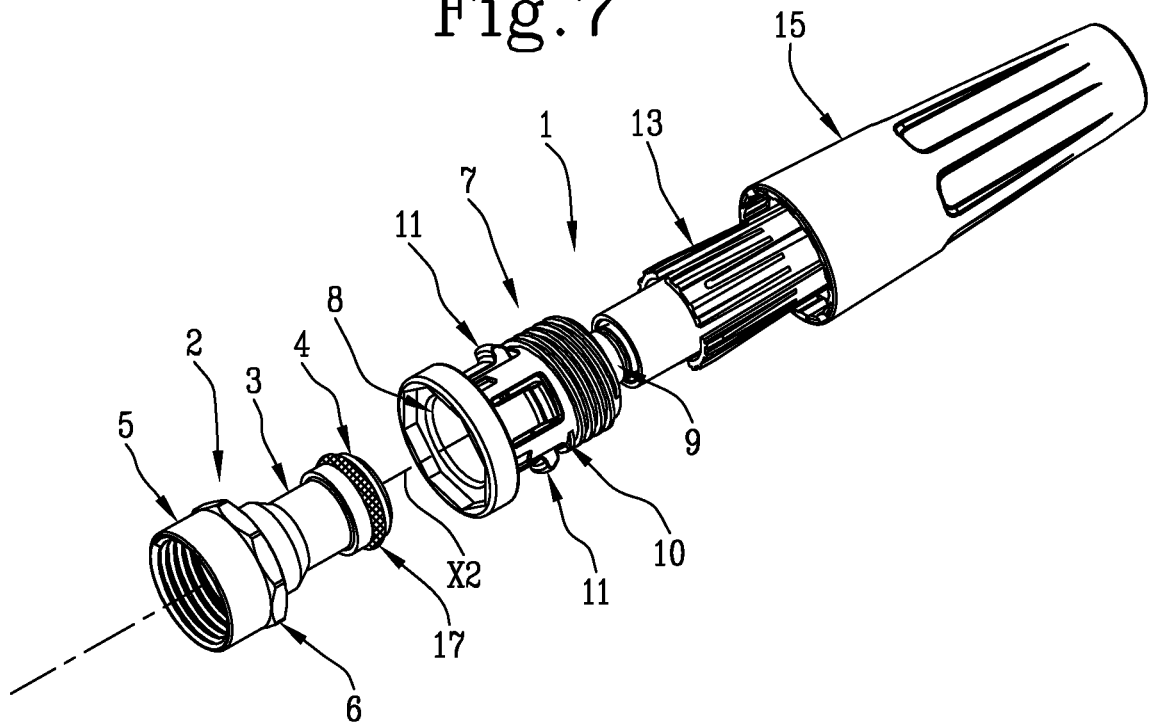
FIG. 7 is an exploded perspective view of a second embodiment of the connecting kit for irrigation hoses.

As illustrated in particular in FIGS. 6 and 7, the connecting kit 1 comprises a male body 2 having a first axis X1 of longitudinal extension.

The male body 2 comprises, at a relative end along the first axis X1, a connector 3, that is to say, a cylindrical protrusion coaxial with the first axis X1 of longitudinal extension.

The connector 3 is equipped with an end head 4, representing an end enlargement of the connector.

In particular, the end head 4 has a first diameter D4 greater than the second diameter D3 of the remaining portion of the connector 3.

The end head 4 extends in a longitudinal direction, that is to say, in a direction parallel to the first axis X1, for a length equal to a first longitudinal extension L4, that is to say, an extension along the direction of the first axis X1.

Again as shown in the accompanying drawings, the male body 2 comprises, at its opposite end relative to the head 4 along the first axis X1, a hollow cylindrical portion 5.

The cylindrical portion 5 is equipped with a thread for joining (coupling) with a tap X or an irrigation accessory Y, which have mutual threads configured for coupling with the thread of said cylindrical portion 5.

According to a first embodiment shown in FIG. 6, the hollow cylindrical portion 5 has the thread on its outer lateral surface.

In this configuration, the thread is of the male type and is configured for coupling with a tap X or an irrigation accessory Y having a thread of the female type, that is to say, on the inner surface of a cylindrical cavity of the tap or irrigation accessory.

In practice, this embodiment is used mainly for coupling the connecting kit 1 to an irrigation accessory Y, which generally have female type threads.

According to a second embodiment shown in FIG. 7, the hollow cylindrical portion 5 has the thread on its inner lateral surface.

In this configuration, the thread is of the female type and is configured for coupling with a tap X or an irrigation accessory Y having a thread of the male type, that is to say, on the outer surface of a cylindrical portion, preferably hollow, of the tap or irrigation accessory.

In practice, this embodiment is used mainly for coupling the connecting kit 1 to a tap X, which generally have male type threads.

The male body 2 also comprises an intermediate portion 6 with a polygonal cross-section between said connector 3 and said cylindrical portion 5.

In the embodiment illustrated in the accompanying drawings, said intermediate portion 6 has a hexagonal cross-section.

In other alternative embodiments not illustrated, said intermediate portion 6 has a polygonal cross-section with a number of sides different from six, for example with a square, pentagonal or octagonal cross-section.

Again as illustrated, the kit 1 comprises a female body 7, having a second axis X2 of longitudinal extension.

The female body 7 has, at a relative end along the second axis X2, a first seat 8 with a polygonal hollow section, configured for housing the intermediate portion 6 of the male body 6.

Preferably, the first seat 8 has a section almost identical to the section of the intermediate portion 6.

In the embodiment illustrated in the accompanying drawings, the first seat 8 has a hexagonal cross-section, configured to be combined with the intermediate portion 6, also with a hexagonal cross-section.

In other alternative embodiments not illustrated, said first seat 8 has a polygonal cross-section with a number of sides different from six, for example with a square, pentagonal or octagonal cross-section.

Advantageously, the fact that the first seat 8 has a cross-section almost identical to the cross-section of the intermediate portion 6 allows, when the intermediate portion 6 is inserted inside the first seat 8, a perfect connection between the male body 2 and female body 7 in such a way that the first axis X1 coincides with the second axis X2, as illustrated in FIG. 3.

In this configuration, that is to say, in the situation in which the intermediate portion 6 is inserted inside the first seat 8, the reciprocal free rotation between the male body 2 and the female body 7 about an axis of rotation coinciding with said first axis X1 and second axis X2 is prevented.

The female body 7 comprises, at its end opposite the first seat 8 along the second axis X2, a hollow cylindrical protuberance 9.

The cylindrical protuberance 9 has a third diameter D9 less than the first diameter D4 of said end head 4.

Advantageously, the fact that the first diameter D4 is greater than the third diameter D9, prevents the possibility that the head 4 can enter inside the cavity of the hollow cylindrical protuberance 9.

The third diameter D9 is also less than a fourth diameter DT of the irrigation hose T, in particular the third diameter D9 is less than the internal diameter of the hose T.

Advantageously, the fact that the internal diameter of the hose T is greater than the third diameter D9, allows the insertion in the hose of the hollow cylindrical protuberance 9 and, therefore, in combination with other elements of the connecting kit which are described below, allows the coupling of the connecting kit with the hose T.

The female body 7 also comprises an intermediate section 10 with a hollow cylindrical shape, interposed between the first seat 8 and the cylindrical protuberance 9, in such a way as to define a sleeve.

There is a thread on the outer lateral surface of the intermediate cross-section 10.

Preferably, the thread is positioned in the intermediate cross-section portion 10, close to the cylindrical protuberance 9.

The intermediate section 10 also comprises a plurality of elastically yieldable plates 11 for locking, in use, the connector 3 inside the female body 7.

The mechanism for locking, in use, the connector 3 inside the female body 7, by means of the plates 11, is described below.

Said plurality of plates 11 is configured to define a narrowing of the intermediate cross-section 10 having a diameter at most equal to the first diameter D4 of the end head 4.

In particular, each plate 11 has an inclined extension relative to the second axis X2 and is equipped with a free end 11A facing towards the inside of the intermediate cross-section 10, in such a way as to define narrowing of the variable diameter.

The mutual positioning between the plurality of plates 11 and the cylindrical protuberance 9, with the inner walls of the intermediate cross-section 10, defines a second seat 12 for the head 4.

More specifically, said plurality of plates 11 is positioned on the lateral surface of the intermediate cross-section in such a way that the second seat 12 has a second longitudinal extension L12, that is to say, an extension along the direction of the second axis X2, greater than the first longitudinal extension L4 of the head 4.

Advantageously, the fact that the second longitudinal extension L12 is greater than the first longitudinal extension L4 allows the head 4 to be contained in the second seat 12 and, preferably, to slide parallel to the second axis X2 inside the second seat 12 between a lower end position P1 for locking and an upper end position P2 of free rotation.

In the lower locking end position P1, shown in FIGS. 2 and 3, the intermediate portion 6 is housed inside the first seat 8 and prevents a relative rotation between the male body 2 and the female body 7.

In the upper end position P2 of free rotation, shown in FIGS. 4 and 5, the intermediate portion 6 is entirely positioned outside the first seat 8 and allows the relative rotation between the male body 2 and the female body 7.

Preferably, each end 11A of the plurality of plates 11 comprises a contact surface 11R extending perpendicularly to the second axis X2.

Advantageously, said contact surface 11R is positioned in the portion of the end 11A facing the second seat 12, in such a way as to allow a more effective contact of the head 4 of the male body 2, when it is inserted in the second seat 12.

As illustrated in FIGS. 6 and 7, the connecting kit 1 comprises an outer sleeve 15 provided, on its inner surface, with a thread configured to couple with the thread of the intermediate section 10 of the female portion (7).

When, through the threads, the female body 7 and the outer sleeve 15 are coupled, said female body is contained, at least partly, inside said outer sleeve 15, as illustrated in FIGS. 3 and 5.

The coupling between the female body 7 and the outer sleeve 15 also allows the coupling with the hose T, which is partly contained inside the outer sleeve 15 and interposed between said female body 7 and outer sleeve 15, as shown in FIGS. 3 and 5.

In order to contain, at least partly, the hose T, the outer sleeve 15 has a sixth diameter D15 greater than the diameter DT of the hose, in particular relative to the outer diameter of the hose.

Preferably, the connecting kit 1 comprises an intermediate sleeve 13, configured to be contained inside the outer sleeve 15 and to contain, at least partly, the cylindrical protuberance 9.

As illustrated in FIGS. 6 and 7, the intermediate sleeve 13 has, on its inner face, a plurality of protrusions 14 designed, in use, to make contact with the hose T so as to obstruct the sliding inside the intermediate sleeve.

The intermediate sleeve 13 has a fifth diameter D13 greater than the fourth diameter DT of the hose T (in particular greater than the outer diameter of the hose T) and less than the sixth diameter D15 of the outer sleeve 15.

This sizing allows the intermediate sleeve 13 to be interposed between the outer sleeve 15 and the hose T.

The methods of coupling the connecting kit 1 with the hose T, on the one hand, and with the tap X or the irrigation accessory Y, on the other, are described below, in such a way as to reproduce the situation illustrated schematically in FIG. 1.

Firstly, the male body 2, through the thread present in the hollow cylindrical portion 5, is connected in an integral fashion, by screwing, with the tap X or the irrigation accessory Y (also comprising a respective thread).

Subsequently, the hose T is inserted inside the cavity of the outer sleeve 15 and, if necessary, inside the cavity of the intermediate sleeve 13, if provided.

Subsequently, the cylindrical protuberance 9 is inserted in one end of the hose T and the outer sleeve 15 is coupled integrally with the female body 7 by screwing, thanks to the threads present in the outer sleeve 15 and the intermediate section 10.

The final coupling between the male body 2 and the female body 7 occurs by means of a pressure applied by a user, who inserts the connector 3 inside the cavity of the female body 7, in such a way that the first axis X1 and the second axis X2 coincide, until the head 4 is inserted inside the second seat 12.

The pressure applied by the user is necessary to overcome the resistance of the plates 11, which, under the effect of the pressure, elastically yield to allow the passage of the head 4 and then return to the original position, wherein the narrowing of the intermediate section 10 has a diameter less than the first diameter D4 of the head 4.

In that way, the head 4 remains locked inside the second seat 12 and only a new pressure applied by the user allows the escape of the head 4 from the second seat 12.

In order to favour the passage of the head 4 from the narrowing of the intermediate cross-section 10 at the plates 11, the end head 4 comprises, in its distal stretch relative to the intermediate portion 6, a tapered portion 18, illustrated for example in FIG. 5.

Advantageously, the tapered portion 18 favours, during the operations for inserting the head 4, the elastic yield of the plates 11, so that the diameter of the narrowing of the intermediate cross-section 10 is at least equal to the first diameter D4 of the head 4 and guarantees the passage of the head.

The operation of the connecting kit 1 in use, during the passage of a fluid, generally water, during irrigation operations, is described below.

When water does not flow from the tap X, and hence from the hose T and the irrigation accessory, the connecting kit 1 is in the configuration shown in FIGS. 2 and 3, that is to say, with the head 4 in the lower end position P1.

When the head 4 is in the lower end position P1, the intermediate portion 6 is housed inside the first seat 8 and the contact between these two elements prevents a relative rotation between the male body 2 and the female body 7.

The actuation of the flowing of the water from the tap X at a sufficient pressure causes the passage of the head 4, inside the second seat 12, from the lower end position P1 to the upper end position P2, shown in FIGS. 4 and 5.

The passage of the head 4 to the upper end position P2 causes a relative moving away between the male body 2 and the female body 7, with a consequent escape of the intermediate portion 6 from the first seat 8.

The lack of contact between the intermediate portion 6 and the first seat 8 allows the free relative rotation between the male body 2 and the female body 7.

Advantageously, the possibility of free relative rotation between the male body 2 and the female body 7 allows the resolution of the twisting problems linked to the twisting of the hose T during use and prevents the user from having to perform complex manoeuvres for the solution of these problems.

Preferably, in order to guarantee a better sliding of the head 4 inside the second seat 12, the head 4 has, on its outer longitudinal surface, a groove 16 configured for housing a ring 17.

The ring 17, generally metallic, protrudes in a radial direction relative to the lateral walls of the head 4, so as to reduce the surface of contact with the inner lateral walls of the second seat 12 and reduce the friction during the sliding movements.

Advantageously, the presence of a contact surface 11R having an extension almost perpendicular to the second axis X2 allows the head 4 to be kept inside the second seat 12 even in the case of high water pressures.

A connecting kit for irrigation hoses structured in this way achieves the preset aims thanks to a rotatable coupling system which overcomes the problems linked to the twisting of the irrigation hoses.

In particular, the connecting kit described avoids the need for the end user to make complex manoeuvres to disentangle the twisting in the hose and guarantee an optimum operation of the hose, guaranteeing a convenient and simple use during the irrigation operations.

The connecting kit described guarantees a convenient coupling to, and detachment from, the tap of the water mains and an easy replacement of the irrigation accessories which can be connected to the hose, keeping practically unaltered the safety and the production cost of the kit compared with the prior art techniques in the field.

The invention claimed is:

1. A connecting kit for an irrigation hose, the connecting kit comprising:
   a hollow male body having a first axis of longitudinal extension and having, at a first end, a connector including an end head having a first diameter greater than a second diameter of a remaining portion of the connector, the end head having a first longitudinal extension; the male body having, at an opposite second end, a hollow cylindrical portion, including a thread for coupling with a tap or an accessory for irrigation, and an intermediate portion with a polygonal cross-section positioned between the connector and the cylindrical portion;

a hollow female body, having a second axis of longitudinal extension and having, at a third end, a first seat with a polygonal hollow cross-section, configured for housing the intermediate portion of the male body, and, at an opposite fourth end, a hollow cylindrical protuberance having a third diameter smaller than both the first diameter of the end head and a fourth diameter of the hose; the female body having an intermediate section with a hollow cylindrical shape, interposed between the first seat and the cylindrical protuberance, to define a sleeve including an external thread; the intermediate section having a plurality of elastically yieldable plates for locking, in use, the connector inside the female body; the plurality of plates being configured to define a narrowing of an intermediate cross-section having a variable diameter at most equal to the first diameter of the end head; each plate having an inclined extension relative to the second axis and having a free end facing towards an interior of the intermediate cross-section; the plurality of plates and the cylindrical protuberance defining, with the inner walls of the intermediate cross-section, a second seat for the end head having a second longitudinal extension greater than the first longitudinal extension of the end head;

an outer sleeve including, on an inner surface thereof, a thread configured to couple with the thread of the intermediate section of the female body.

2. The connecting kit according to claim 1, and further comprising an intermediate sleeve having, on an inner face thereof, a plurality of protrusions configured, in use, to abut the hose and having a fifth diameter greater than the fourth diameter of the hose and smaller than a sixth diameter of the outer sleeve.

3. The connecting kit according to claim 1, wherein each end of the plurality of plates comprises an abutment surface for engaging the end head of the male body, the abutment surface extending perpendicularly to the second axis.

4. The connecting kit according to claim 1, wherein the intermediate portion and the first seat have a hexagonal cross-section.

5. The connecting kit according to claim 1, wherein the cylindrical portion has the thread on an outer longitudinal surface.

6. The connecting kit according to claim 1, wherein the cylindrical portion has the thread on an inner longitudinal surface.

7. The connecting kit according to claim 1, wherein the end head has a distal stretch relative to the intermediate portion, and in the distal stretch, a tapered portion.

8. The connecting kit according to claim 1, wherein the end head has, on an outer longitudinal surface, a groove configured for housing a ring.

9. The connecting kit according to claim 1, wherein the end head is configured to slide inside the second seat along the second axis between a lower end position of locking, wherein the intermediate portion is housed inside the first seat and prevents relative rotation between the male body and the female body, and an upper end position of free rotation, wherein the intermediate portion is positioned out of the first seat and allows the free rotation between the male body and the female body.

* * * * *